United States Patent
Yi et al.

(10) Patent No.: US 10,462,836 B2
(45) Date of Patent: Oct. 29, 2019

(54) METHOD AND APPARATUS FOR SUPPORTING AMORPHOUS CELL IN WIRELESS COMMUNICATION SYSTEM

(71) Applicant: LG ELECTRONICS INC., Seoul (KR)

(72) Inventors: Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 15/325,652

(22) PCT Filed: Aug. 6, 2015

(86) PCT No.: PCT/KR2015/008264
§ 371 (c)(1),
(2) Date: Jan. 11, 2017

(87) PCT Pub. No.: WO2016/021969
PCT Pub. Date: Feb. 11, 2016

(65) Prior Publication Data
US 2017/0135097 A1 May 11, 2017

Related U.S. Application Data

(60) Provisional application No. 62/033,668, filed on Aug. 6, 2014.

(51) Int. Cl.
| | |
|---|---|
| *H04W 72/04* | (2009.01) |
| *H04W 76/15* | (2018.01) |
| *H04W 16/32* | (2009.01) |
| *H04W 76/11* | (2018.01) |
| *H04L 5/00* | (2006.01) |
| *H04W 24/02* | (2009.01) |
| *H04W 48/16* | (2009.01) |

(52) U.S. Cl.
CPC ........... *H04W 76/15* (2018.02); *H04L 5/0032* (2013.01); *H04W 16/32* (2013.01); *H04W 24/02* (2013.01);
(Continued)

(58) Field of Classification Search
CPC .............. H04W 84/045; H04W 24/10; H04W 72/0453; H04W 76/15; H04W 88/08;
(Continued)

(56) References Cited

U.S. PATENT DOCUMENTS

| | | | |
|---|---|---|---|
| 2012/0163305 A1* | 6/2012 | Nimbalker | ........ H04W 52/0206 370/329 |
| 2014/0029531 A1* | 1/2014 | Chang | ................... H04W 16/14 370/329 |

(Continued)

FOREIGN PATENT DOCUMENTS

| | | |
|---|---|---|
| CN | 101772028 A | 7/2010 |
| EP | 2375805 A1 | 10/2011 |

(Continued)

OTHER PUBLICATIONS

CMCC, "Handling of MeNB HO and SeNB change for dual connectivity operation", R2-140135, 3GPP TSG-RAN WG2 Meeting #85, Prague, Czech Republic, Feb. 10-14, 2014, 9 pgs.

*Primary Examiner* — Sai Aung
(74) *Attorney, Agent, or Firm* — Birch, Stewart, Kolasch & Birch, LLP

(57) ABSTRACT

A method and apparatus for communicating with a user equipment (UE) in a wireless communication system is provided. By using concept of dual connectivity, a network may configure a plurality of cells as a master evolved NodeB (MeNB) and each cell among the plurality of cells as a secondary eNB (SeNB), and communicate with the UE using the configured plurality of cells. Alternatively, by using concept of coordinated multi-points (CoMP) transmission, the network may configure a plurality of transmission points (TPs) for a virtual cell, and communicate with the UE using the configured plurality of TPs.

7 Claims, 17 Drawing Sheets

(52) U.S. Cl.
CPC ....... *H04W 48/16* (2013.01); *H04W 72/0446* (2013.01); *H04W 76/11* (2018.02)

(58) Field of Classification Search
CPC . H04W 74/0833; H04W 88/02; H04W 48/16; H04W 72/0406; H04W 72/042; H04W 48/12
See application file for complete search history.

(56) References Cited

U.S. PATENT DOCUMENTS

| | | | |
|---|---|---|---|
| 2014/0185480 A1 | 7/2014 | Lee et al. | |
| 2016/0157223 A1* | 6/2016 | Nogami | H04W 16/32 370/329 |
| 2016/0165547 A1* | 6/2016 | Ouchi | H04W 52/146 455/522 |
| 2016/0295462 A1* | 10/2016 | Lunden | H04W 36/0055 |

FOREIGN PATENT DOCUMENTS

| | | |
|---|---|---|
| WO | WO 2006/102918 A1 | 10/2006 |
| WO | WO 2010/133034 A1 | 11/2010 |
| WO | WO 2011/052870 A1 | 5/2011 |
| WO | WO 2013/163597 A1 | 10/2013 |
| WO | WO 2014/017880 A1 | 1/2014 |
| WO | WO 2014/107086 A1 | 7/2014 |
| WO | WO 2014/112783 A1 | 7/2014 |
| WO | 2015/069026 A1 | 5/2015 |

* cited by examiner

[Fig. 1]
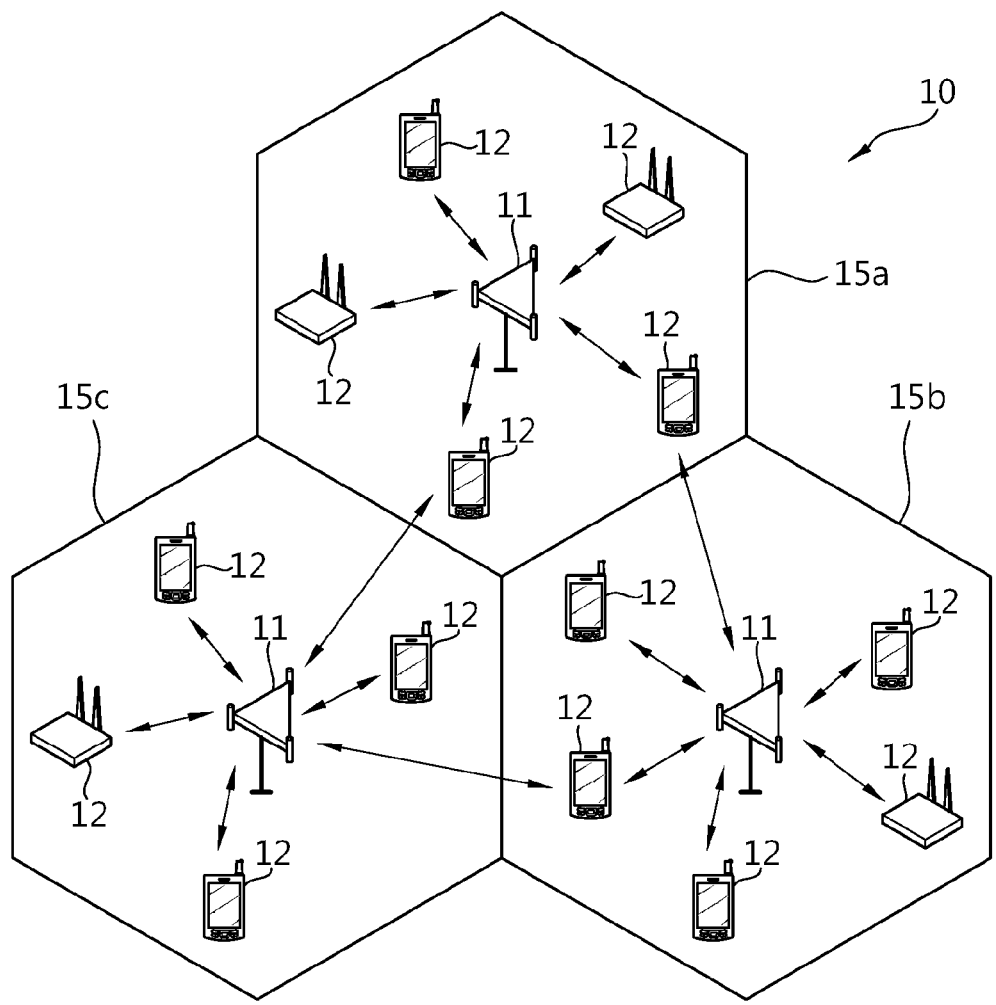
[Fig. 2]
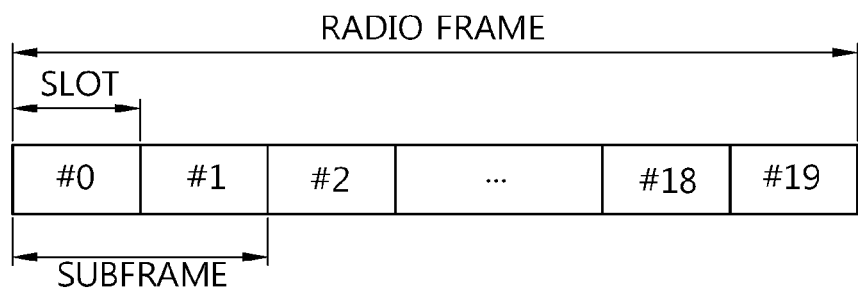

[Fig. 3]
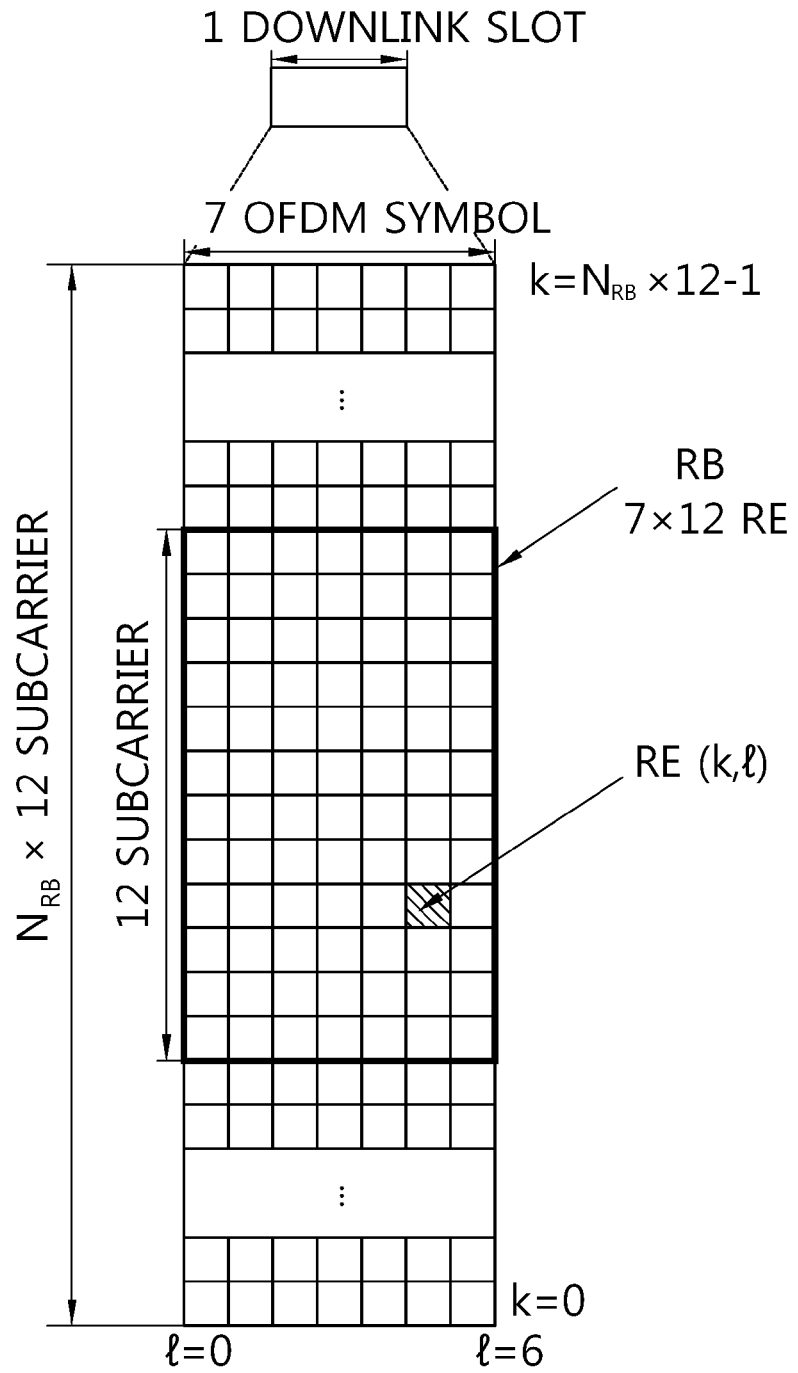

[Fig. 4]
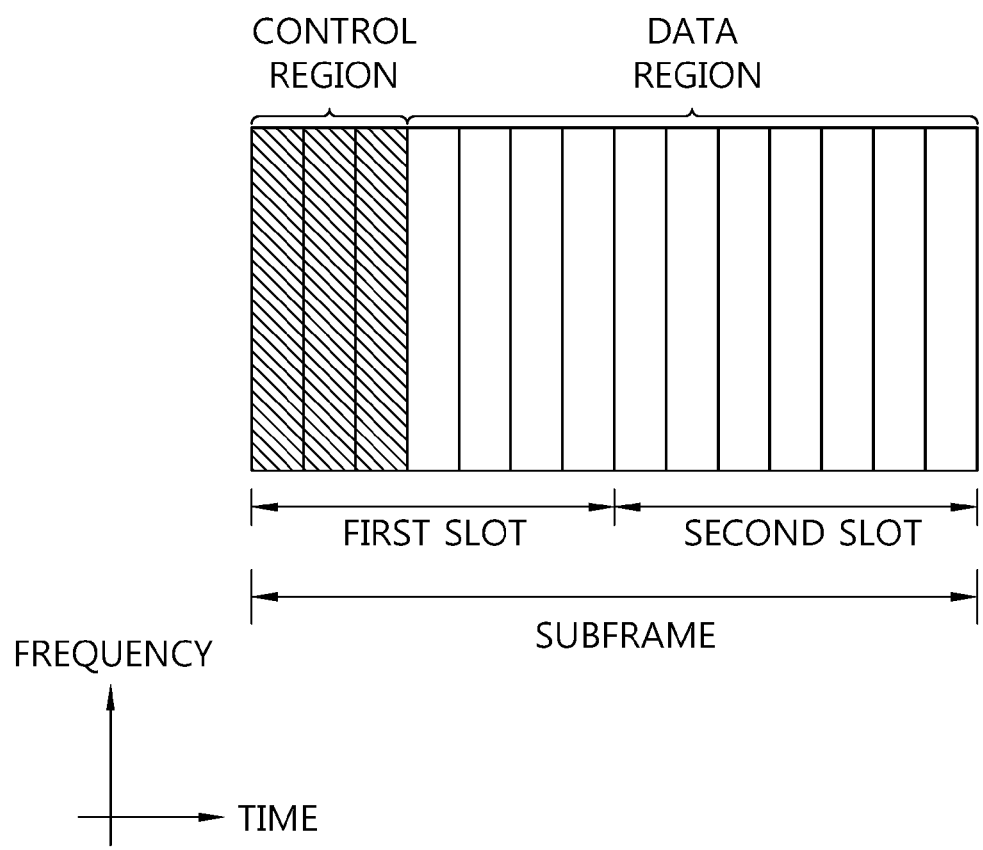

[Fig. 5]
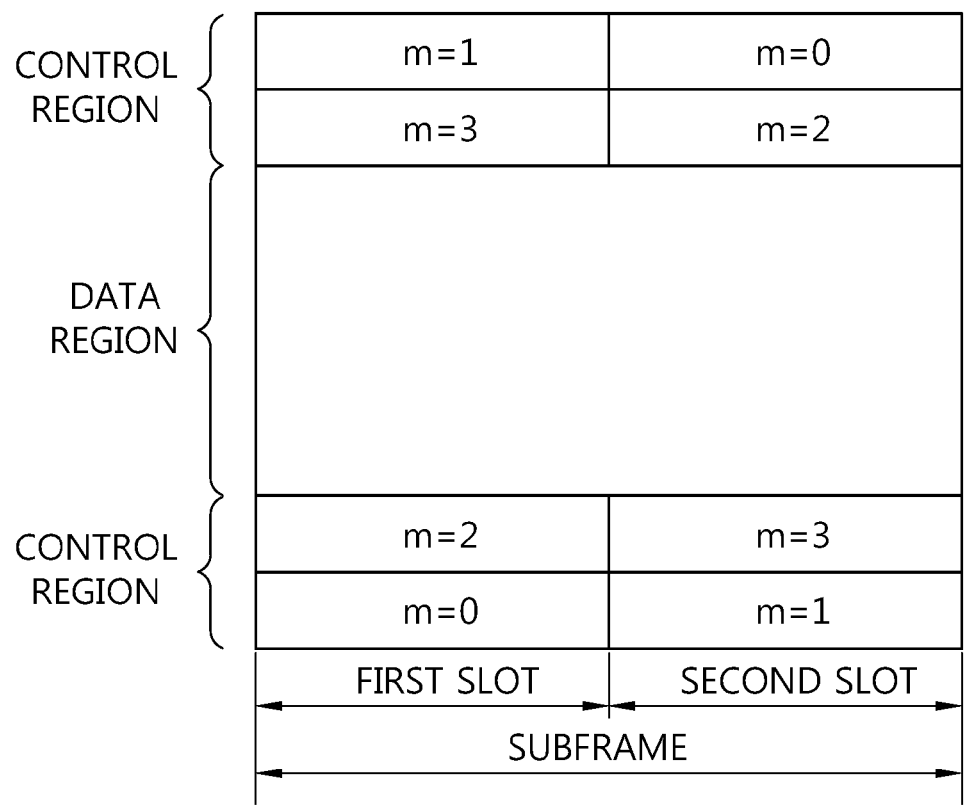

[Fig. 6]
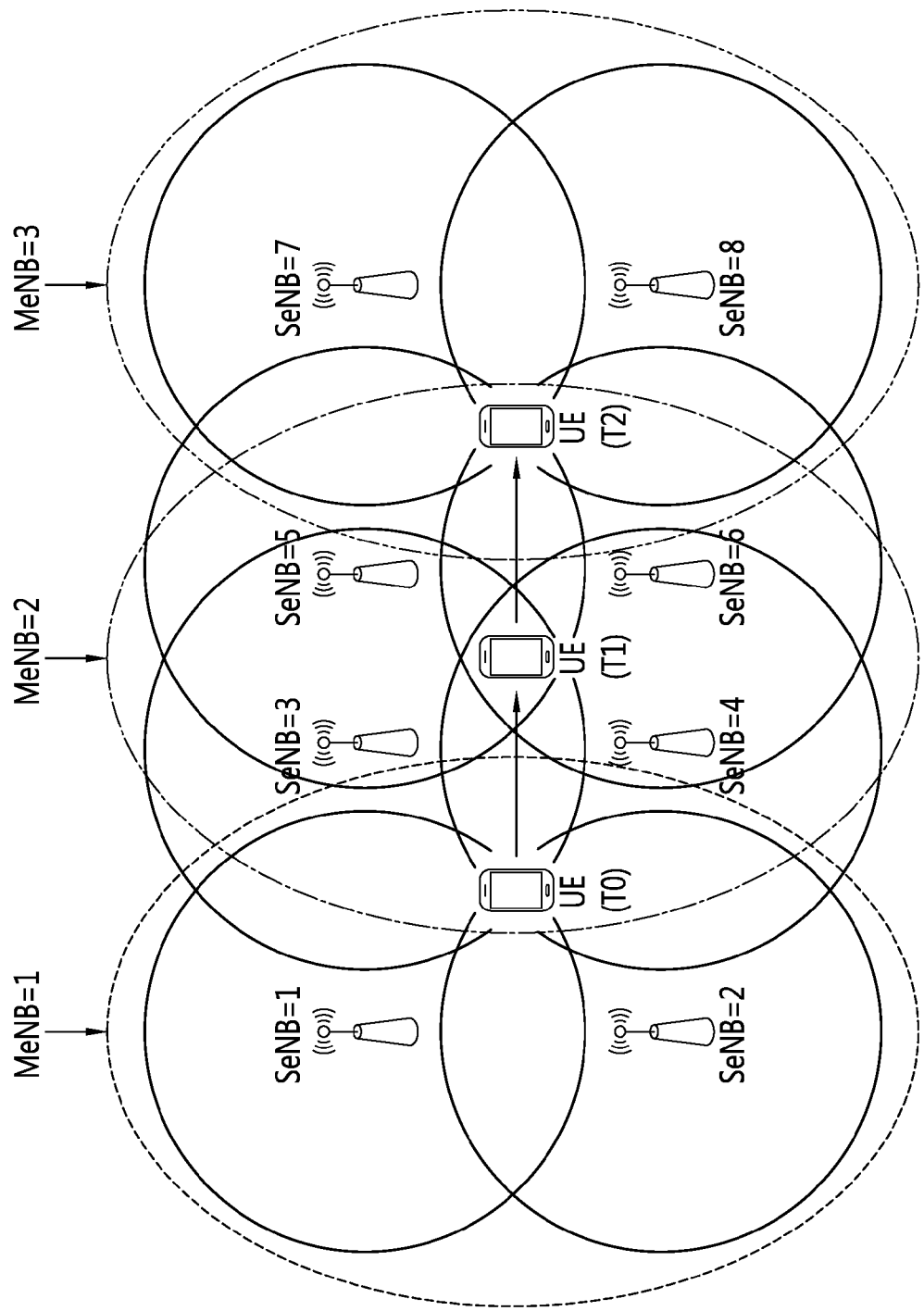

[Fig. 7]
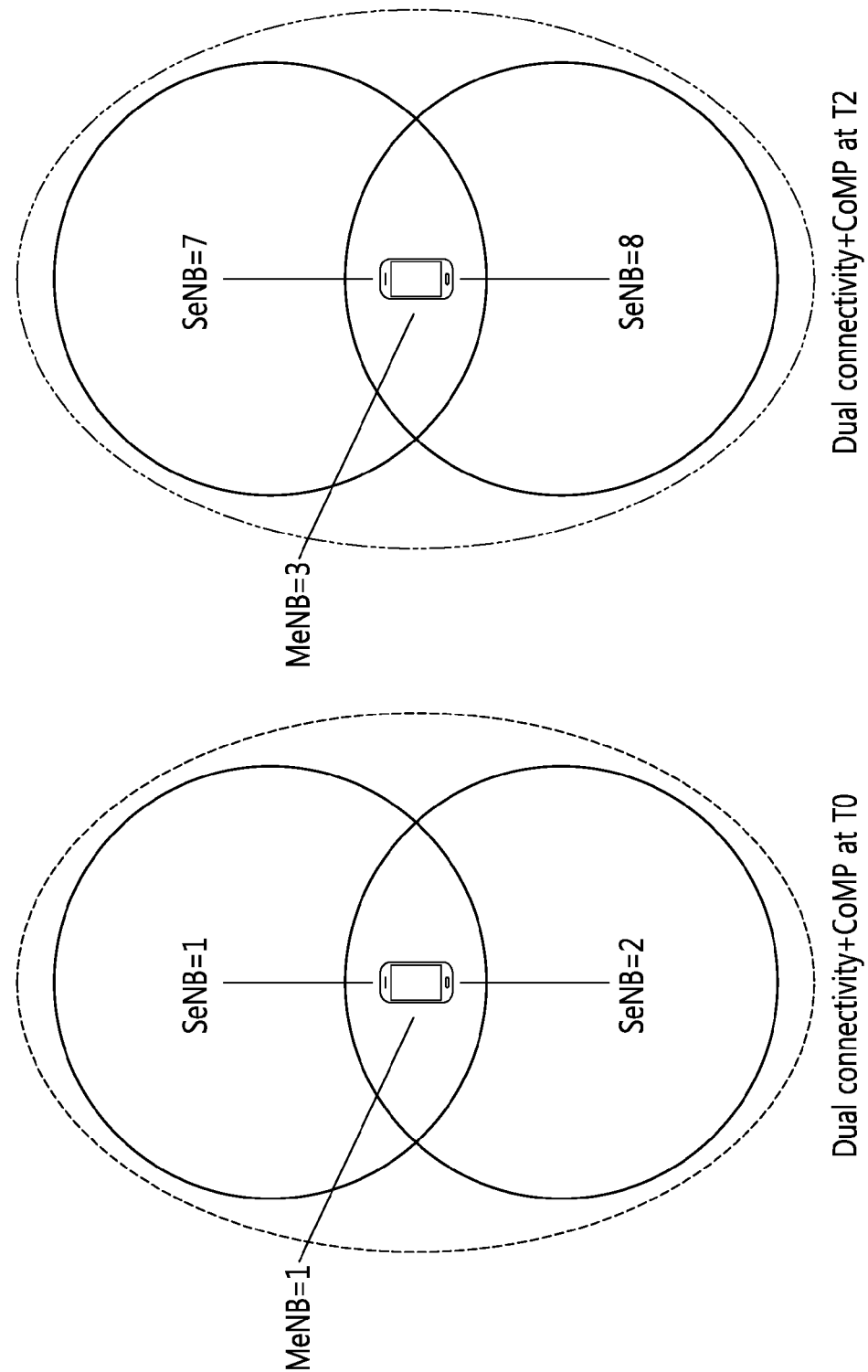

[Fig. 8]
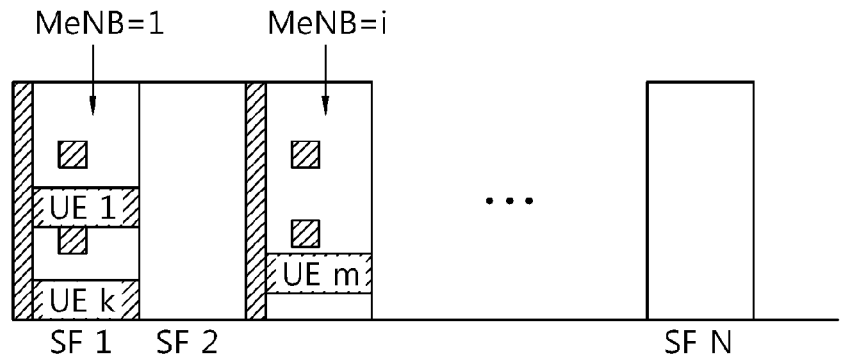
[Fig. 9]
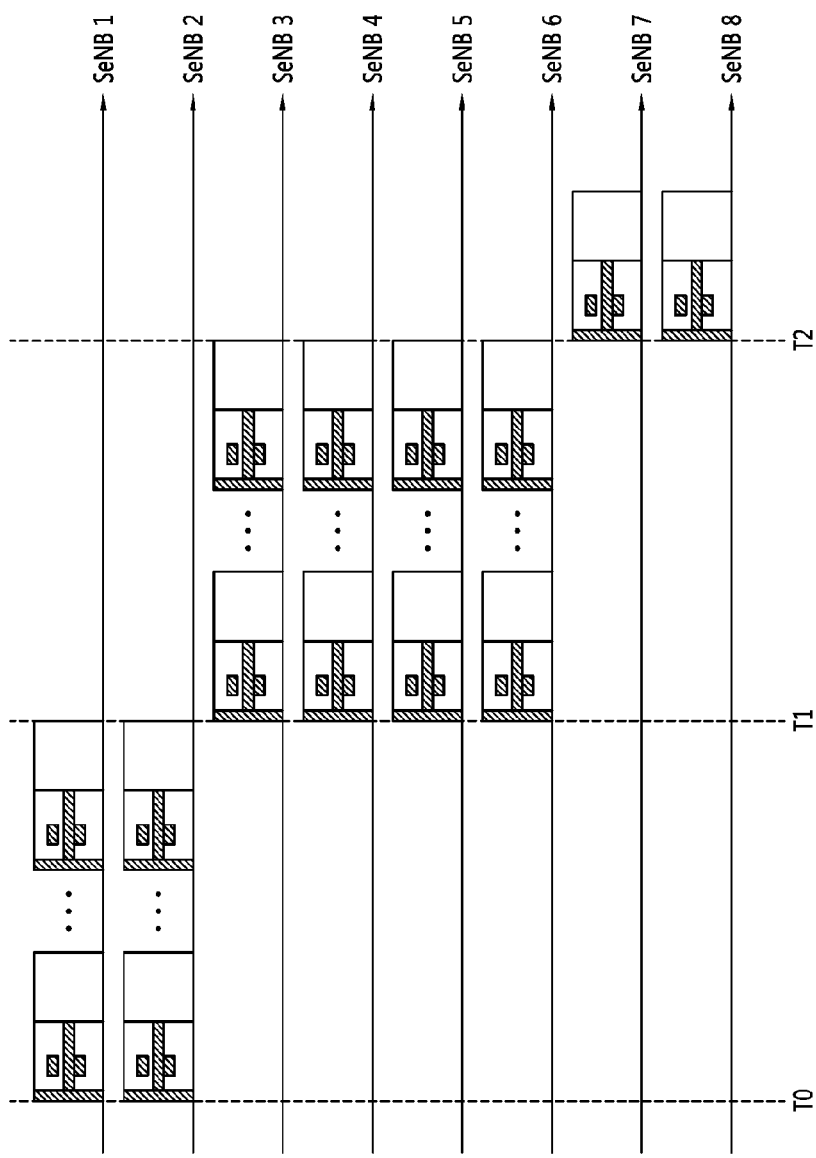

[Fig. 10]
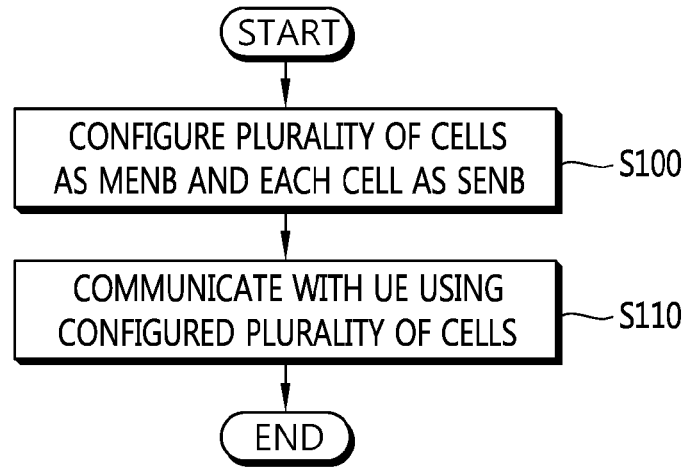

[Fig. 11]
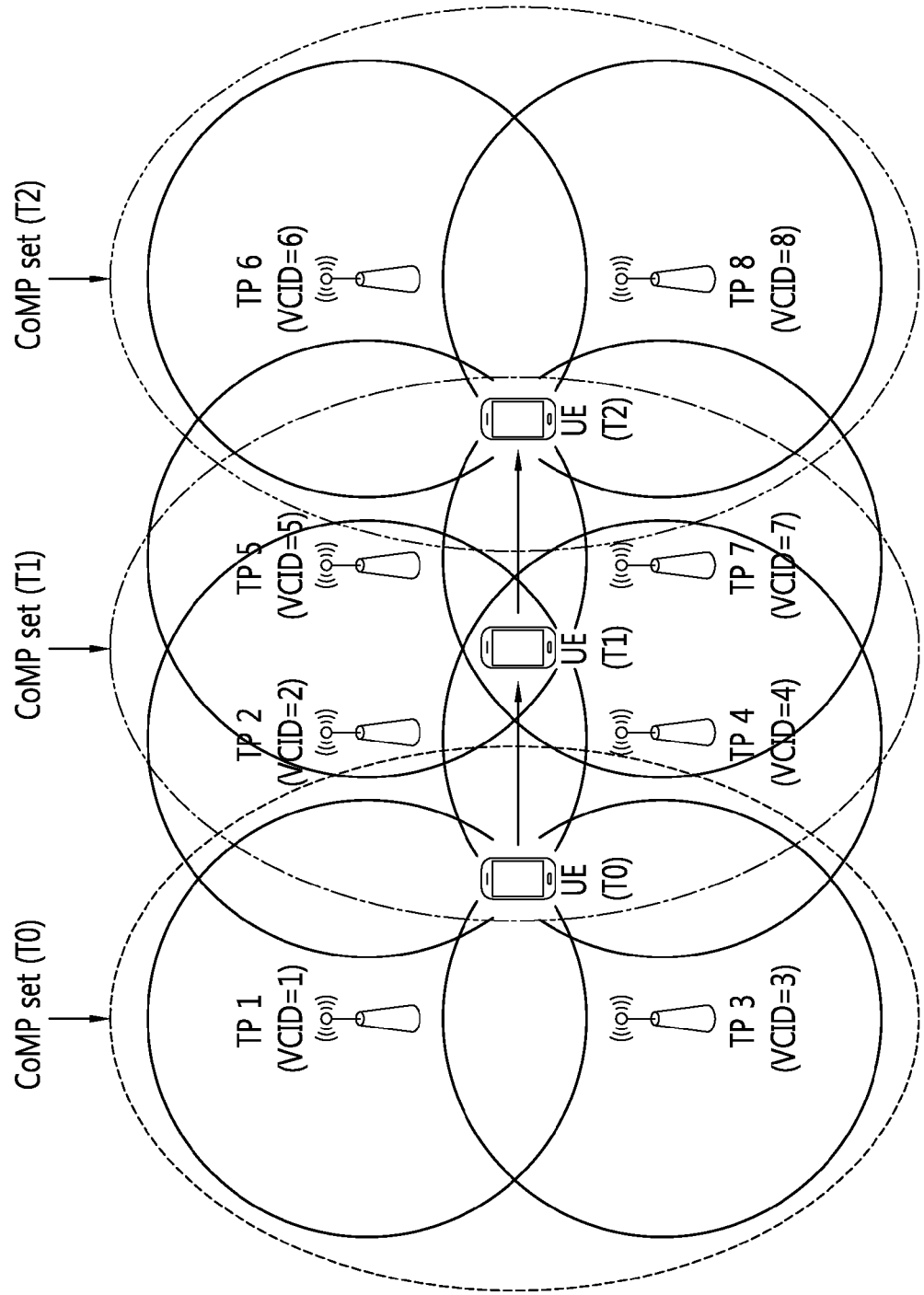

[Fig. 12]
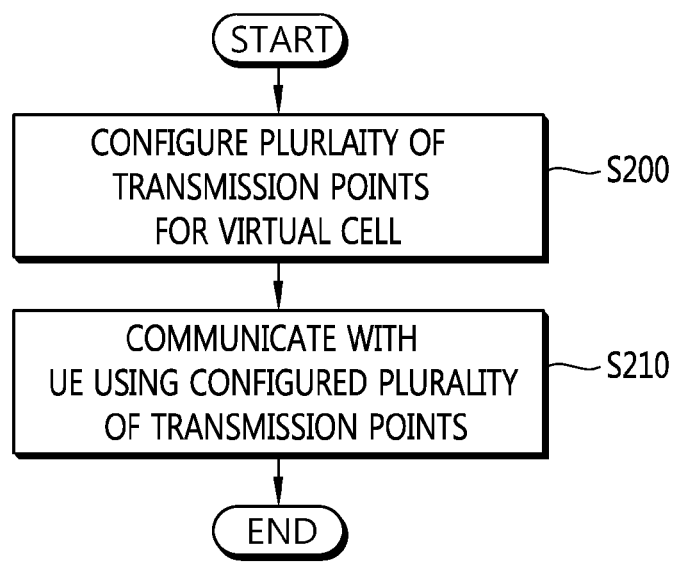

[Fig. 13]
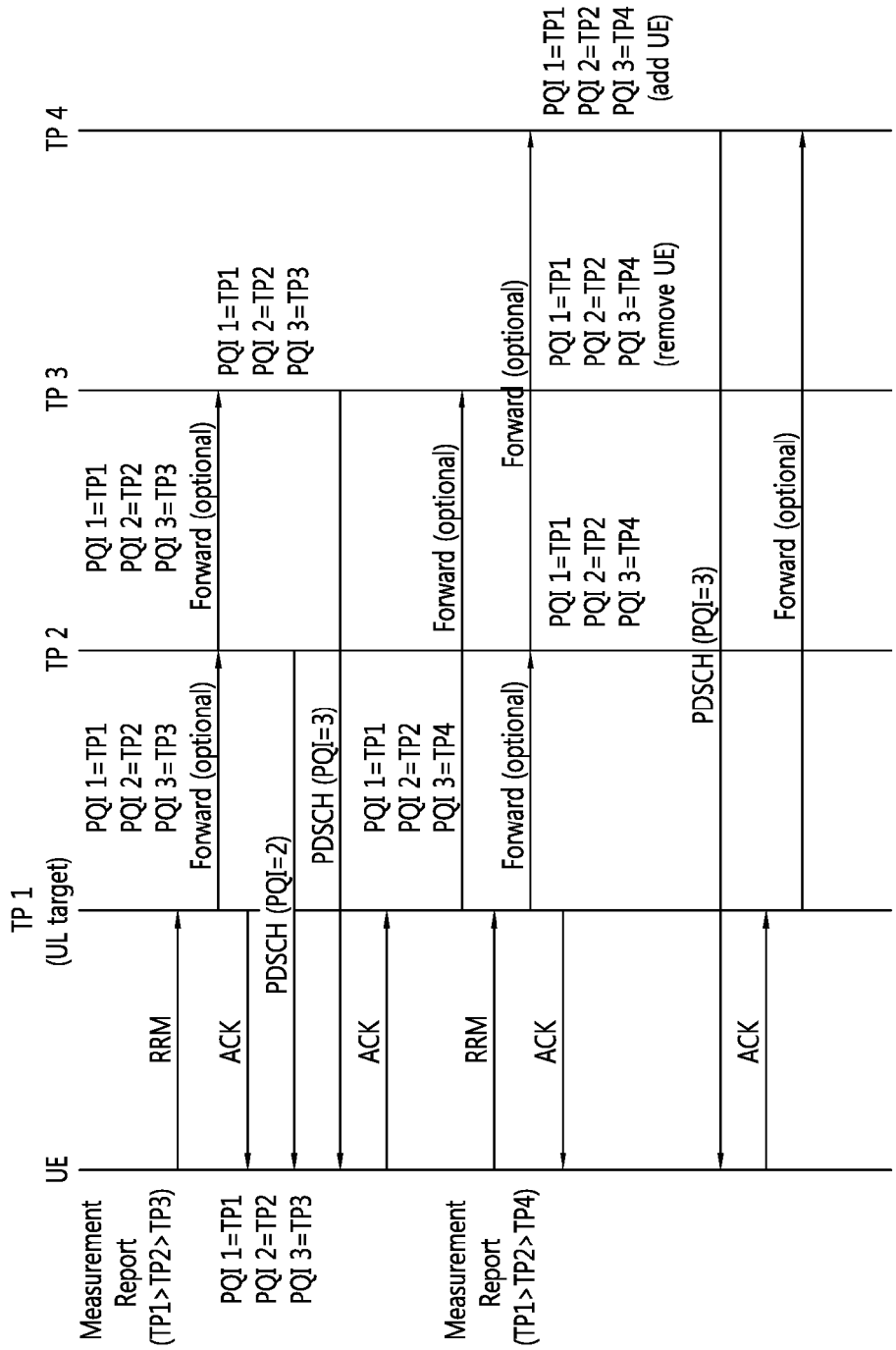

[Fig. 14]
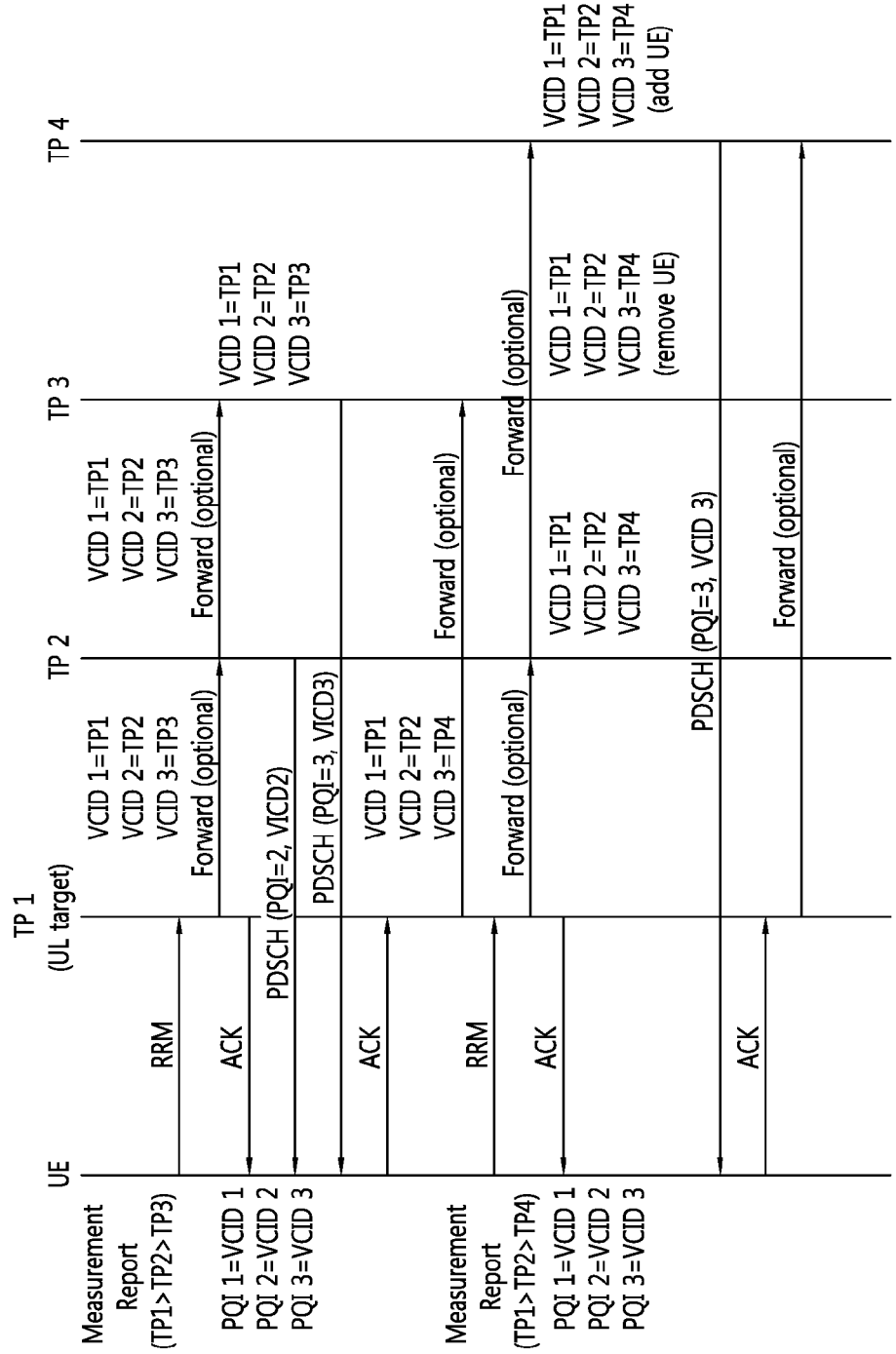

[Fig. 15]
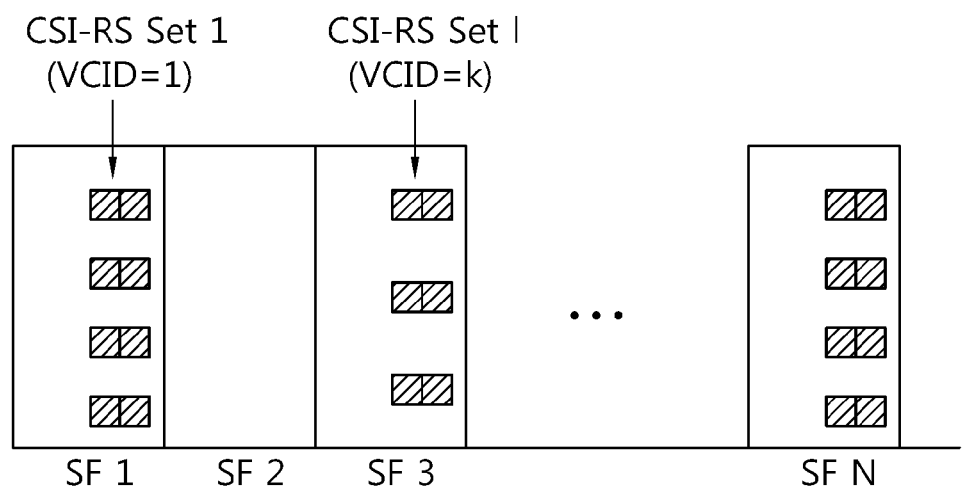

[Fig. 16]
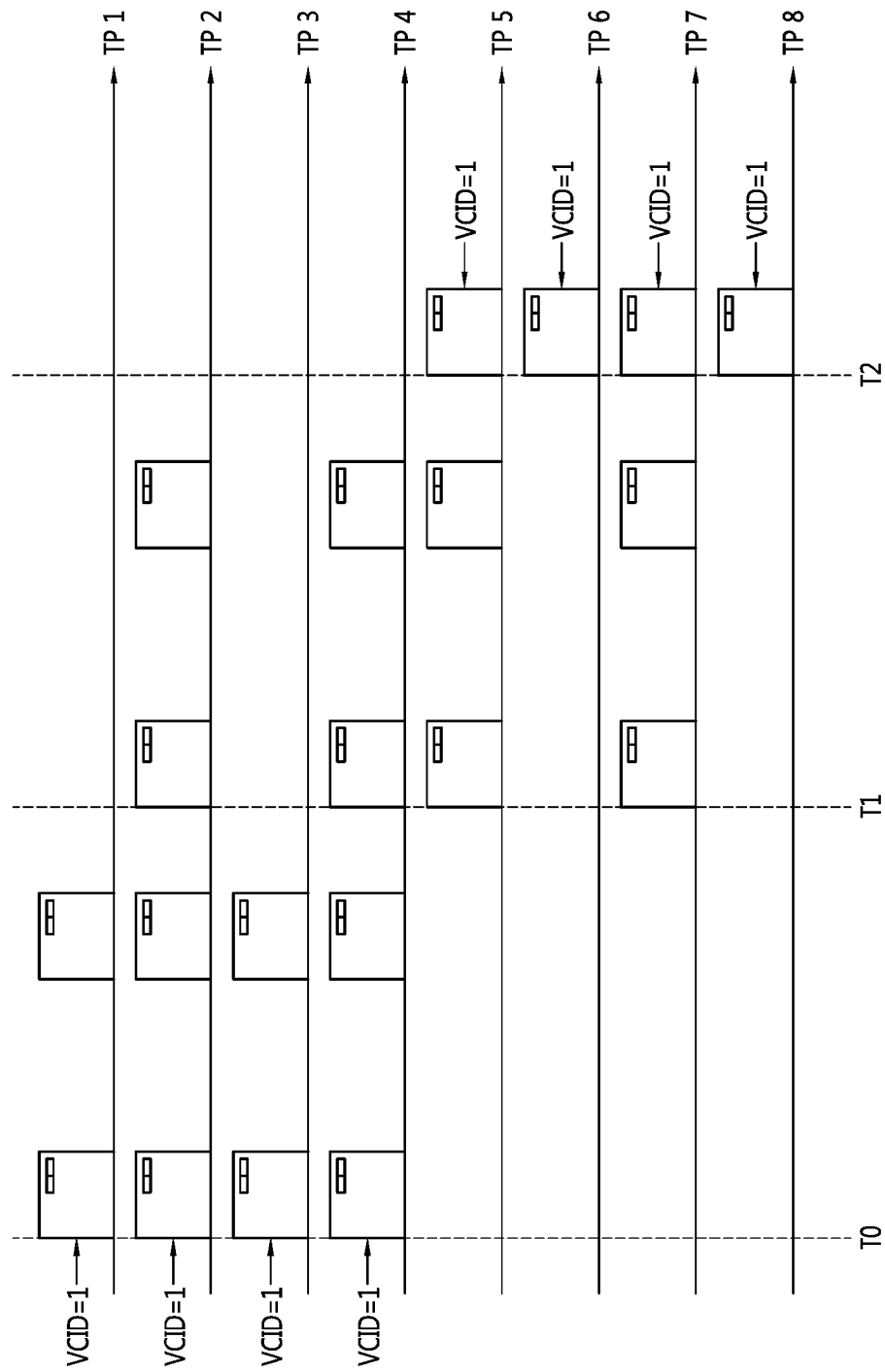

[Fig. 17]
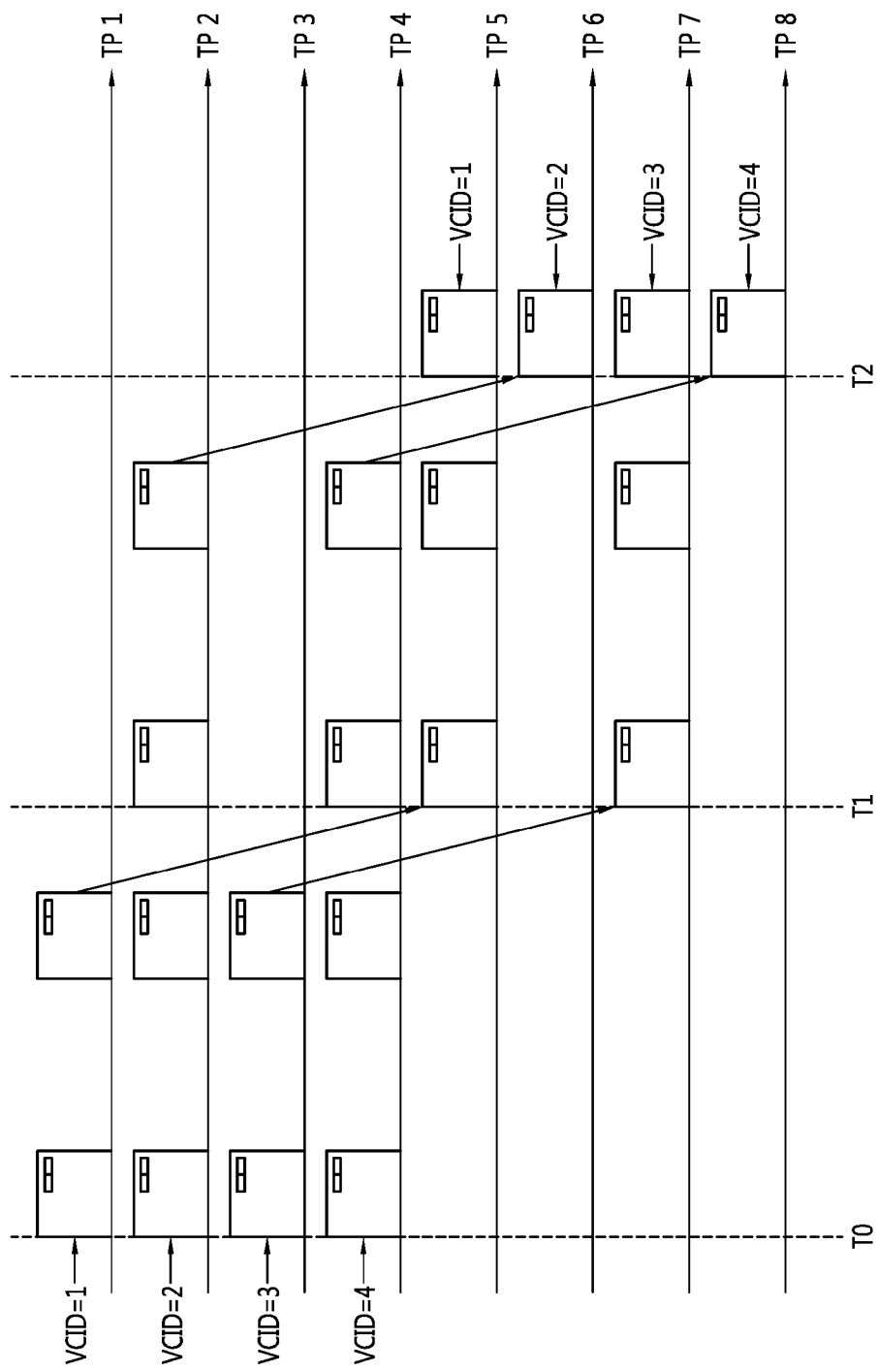

[Fig. 18]
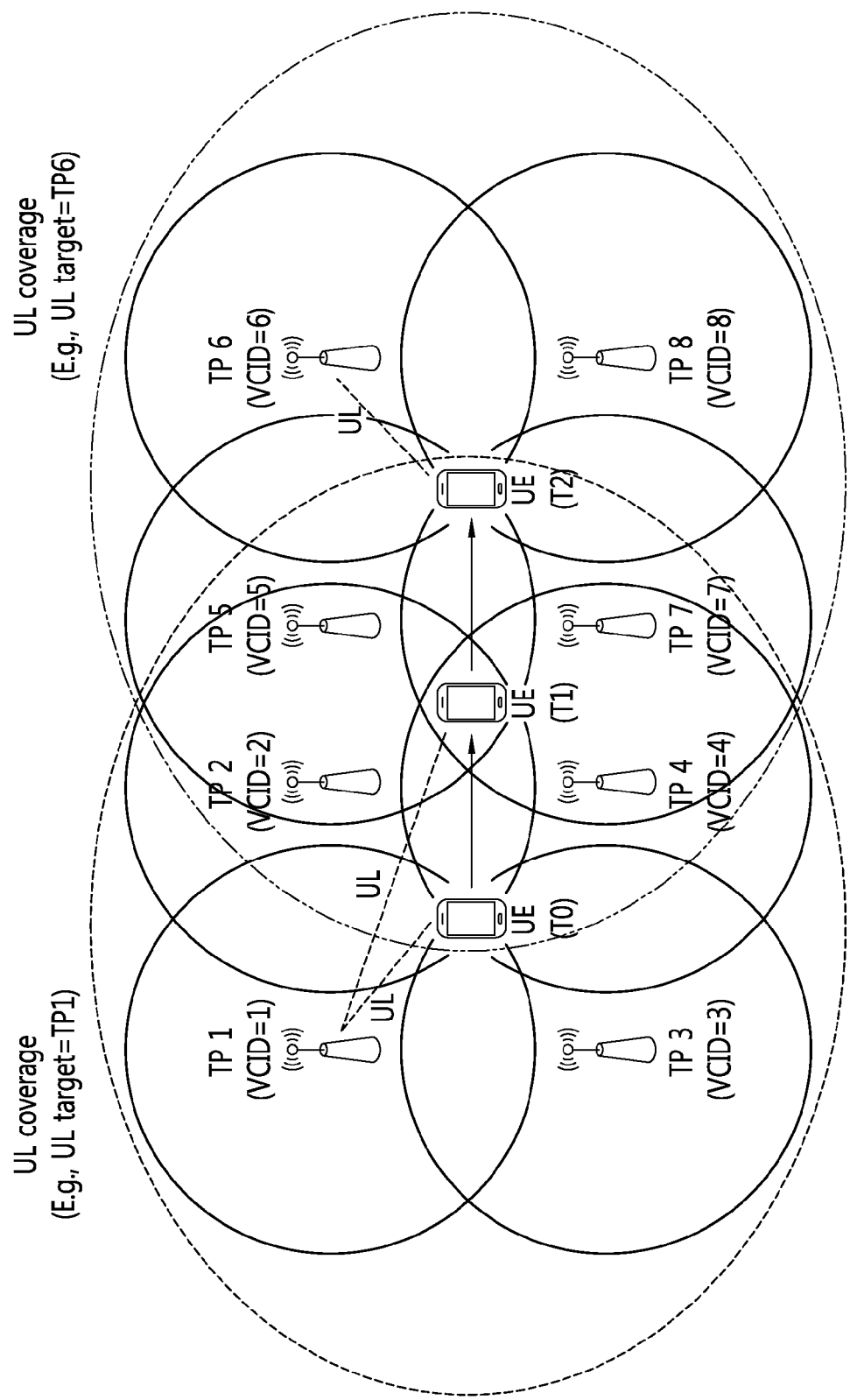

[Fig. 19]
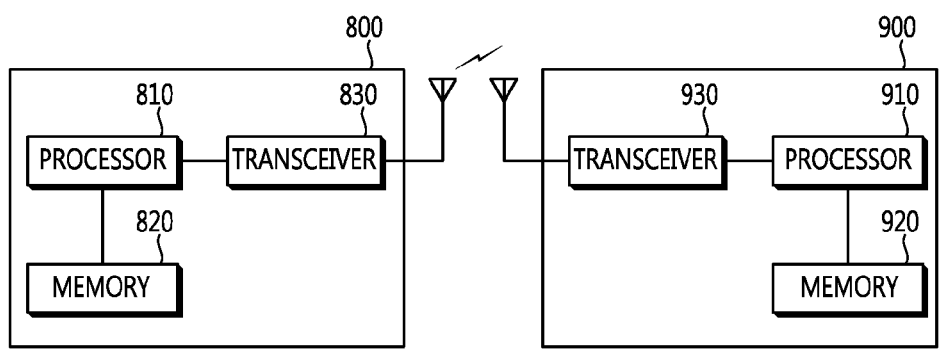

METHOD AND APPARATUS FOR SUPPORTING AMORPHOUS CELL IN WIRELESS COMMUNICATION SYSTEM

CROSS REFERENCE TO RELATED APPLICATIONS

This application is the National Phase of PCT International Application No. PCT/KR2015/008264, filed on Aug. 6, 2015, which claims priority under 35 U.S.C. 119(e) to U.S. Provisional Application No. 62/033,668, filed on Aug. 6, 2014, all of which are hereby expressly incorporated by reference into the present application.

TECHNICAL FIELD

The present invention relates to wireless communications, and more particularly, to a method and apparatus for supporting an amorphous cell in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Coordinated multi-point (CoMP) transmission and reception has been considered for 3GPP LTE Rel-11 as a tool to improve the coverage of high data rates, the cell-edge throughput, and also to increase system throughput. Downlink (DL) CoMP transmission implies dynamic coordination among multiple geographically separated transmission points (TPs). Uplink (UL) CoMP reception implies coordination among multiple, geographically separated points. Uplink CoMP reception can involve joint reception (JR) of the transmitted signal at multiple reception points and/or coordinated scheduling (CS) decisions among points to control interference and improve coverage.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a user equipment (UE) consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

As the network becomes denser and smaller, the frequency of needed handover or switching of the cell may increase. The handover frequency may impact the overall UE throughput and quality of experience (QoE). Thus, to support efficient dense small cell operation, it is essential to enhance UE mobility handling such that a UE can freely move around a set of small cells without handover procedures or any radio resource control (RRC) reconfigurations which may lead relatively high overhead.

DISCLOSURE OF INVENTION

Technical Problem

The present invention provides a method and apparatus for supporting an amorphous cell in a wireless communication system. The present invention provides a method and apparatus for network management and configuration procedures to support an amorphous cell. The present invention provides a method and apparatus for managing an amorphous cell by using dual connectivity or dynamic coordinated multi-point (CoMP) transmission.

Solution to Problem

In an aspect, a method for communicating, by a network, with a user equipment (UE) in a wireless communication system is provided. The method includes configuring a plurality of cells as a master evolved NodeB (MeNB) and each cell among the plurality of cells as a secondary eNB (SeNB), and communicating with the UE using the configured plurality of cells.

In another aspect, a method for communicating, by a network, with a user equipment (UE) in a wireless communication system is provided. The method includes configuring a plurality of transmission points (TPs) for a virtual cell, and communicating with the UE using the configured plurality of TPs.

Advantageous Effects of Invention

User equipments (UEs) can be moved without frequent handover procedures.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 and FIG. 7 show an example of configuration of an amorphous cell by dual connectivity according to an embodiment of the present invention.
FIG. 8 shows an example of UE-dedicated resources according to an embodiment of the present invention.
FIG. 9 shows another example of UE-dedicated resources according to an embodiment of the present invention.
FIG. 10 shows an example of a method for communicating with a UE according to an embodiment of the present invention.
FIG. 11 show an example of configuration of an amorphous cell by dynamic CoMP set according to an embodiment of the present invention.
FIG. 12 shows another example of a method for communicating with a UE according to an embodiment of the present invention.

FIG. 13 shows an example of a RRM measurement based automatic CoMP set update procedure according to an embodiment of the present invention.

FIG. 14 shows an example of a UE-dedicated resource based transparent TP update procedure according to an embodiment of the present invention.

FIG. 15 shows an example of resource mapping for each VCID and change of VCID according to an embodiment of the present invention.

FIG. 16 shows an example of resource usage based on joint transmission according to an embodiment of the present invention.

FIG. 17 shows an example of resource usage based on dynamic point selection according to an embodiment of the present invention.

FIG. 18 shows an example of DL/UL separation according to an embodiment of the present invention.

FIG. 19 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number NAL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit ((Tx)) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of (Tx)power control commands on individual UEs within an arbitrary UE group, a (Tx)power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In 3GPP Rel-11, coordinated multi-point (CoMP) has been proposed and specified, which allows efficient collaboration among a set of transmission points (TPs). To support CoMP operation, it has been proposed/accepted to introduce virtual cell concept where a UE can be configured with a set of virtual cell IDs (each may correspond to one TP) along with collaborating TPs utilizing the same cell ID. In that sense, from a UE perspective, it seems to be served by a large cell (a combination of collaborating TPs) with a cell ID and data can be transmitted from different TPs either via joint transmission or point selection (either dynamic or semi-static). To minimize the handover overhead, it is therefore straightforward to consider extending CoMP concept. Another technology being considered to address handover issue is to use dual connectivity where a UE is associated with more than one eNB at one time where one eNB maintains the UE mobility/connectivity and the other eNB can be utilized for data offloading purpose. The motivation of this concept is to allow a UE can separate C-Plane and U-Plane by having different carrier groups.

Hereinafter, based on two concepts described above, a method for configuring/managing an amorphous cell according to an embodiment of the present invention is described. The amorphous cell may refer to some kinds of a virtual cell to support moving UEs without frequent handover procedures.

First, configuration of an amorphous cell by maintaining dual connectivity via cell collaboration according to an embodiment of the present invention is described.

FIG. 6 and FIG. 7 show an example of configuration of an amorphous cell by dual connectivity according to an embodiment of the present invention. According to an embodiment of the present invention, a set of collaborating cells, where each set may be configured as a master eNB (MeNB) in dual connectivity and each cell may be configured as a secondary eNB (SeNB) in dual connectivity separately, may be managed. For example, referring to FIG. 6, at time T0, a UE may be configured with MeNB=1 (which may be served by the collaboration of SeNB=1 and SeNB=2) and SeNB=1 (and potentially SeNB=2). Switch from one MeNB to another MeNB may require the handover procedure. For example, from T0 to T1, the handover procedure may be necessary. Accordingly, at time T1, a UE may be configured with MeNB=2 (which may be served by the collaboration of SeNB=3, SeNB=4, SeNB=5 and SeNB=6) and SeNB=3 (and potentially SeNB=4, SeNB=5 or SeNB=6). Likewise, from T1 to T2, the handover procedure may be necessary. Accordingly, at time T2, a UE may be configured with MeNB=3 (which may be served by the collaboration of SeNB=7 and SeNB=8) and SeNB=7 (and potentially SeNB=8). FIG. 7 only shows configuration of an amorphous cell described in FIG. 6 at time T0 and T2.

To support MeNB functionality by the set of collaborating cells, the following may be proposed according to an embodiment of the present invention.

- A set of subframes and/or resources may be reserved for each MeNB functionality. In that resource, each cell in the collaborating set may transmit signals/reference signal (RS) using MeNB cell ID (for example, MeNB=1 by SeNB=1 and SeNB=2). The data/control signal/RS may be transmitted by collaborating cells in single frequency network (SFN) manner or a representative cell may transmit single copy of signal.
- In other subframes and/or resources, each cell may transmit data/control signal/RS using its own cell ID.
- The network may configure time division multiplexing (TDM) information between the MeNB and SeNB, as they are operating in the same frequency.
- The network may also configure discovery signal based measurement, as cell-specific reference signal (CRS) from the MeNB may not always be transmitted.

The approach described above may be simple, yet, may not offer handover-free operation. Thus, further enhancement of transparent switch of the MeNB according to an embodiment of the present invention may be considered. For this, overall two approaches may be considered.

One approach is to quickly reconfigure the MeNB via such as dynamic downlink control indication signal or media access control (MAC) control element (CE), when a UE switches from one MeNB from the other MeNB. For example, from MeNB=1 to MeNB=2, a UE may be pre-configured with the necessary RRC configurations of both MeNBs and switch between two MeNBs via L1 signaling such as DCI format 1C. Another alternative is to autonomously switch the serving MeNB based on UE measurement. For example, based on discovery signal, the UE may report measurements on MeNB cells. When the best cell changes in the measurement reports, the network may also switch the serving MeNB, and, the UE may also switch its serving MeNB. For example, if the UE detects that MeNB=2 is the best cell via measurement (for a certain time threshold such as 200 ms), then the UE may report the best cell change (e.g., triggered by measurement events), then may switch its serving from MeNB=1 to MeNB=2. Since the configuration of each MeNB is pre-allocated to the UE, the UE may update all the necessary RRC parameters and configurations. To avoid any ambiguity between the UE and the network in case of radio resource management (RRM) measurement report drop or failure delivery, the network may transmit confirmation once the network switches the serving MeNB.

Another approach is to configure a UE-specific cell ID and its associated resource which the UE can carry along so that the cells can utilize the configured resource to transmit the necessary data/control signal/RS. For example, for UE1, a specific set of subframes and/or resources with cell ID used for the MeNB, which may be used by cells in the network regardless of UE mobility to serve the UE, may be allocated. Upon creating association, the network may configure the cell ID used for the UE as well as the resources which the network will use to transmit any data/control signal/RS.

FIG. 8 shows an example of UE-dedicated resources according to an embodiment of the present invention. Referring to FIG. 8, a cell ID may be associated with a specific resource. For example, MeNB ID 1 is used in subframe 1, and MeNB ID 2 is used in subframe 2, and so on. Each cell in the collaborating set may transmit signals using different scrambling ID based on subframe index. For example, a UE served by MeNB ID=1 may be received any signal/data in subframe 1, as the corresponding resource is fixed for MeNB=1. Since there may be multiple UEs in the network, the possible number of MeNBs may be fixed (for example, maximum 10 MeNB IDs). The coordinated mapping between resource and cell ID may be determined by a cell or a centralized controlling eNB/cell or a dedicated controller and be broadcasted to the eNBs/cells via X2 or equivalent signaling. If this is used, the collaborating cells/TPs may change according to UE mobility.

FIG. 9 shows another example of UE-dedicated resources according to an embodiment of the present invention. In change of participating MeNB, each cell/TP may use UE-dedicated resource and cell ID to transmit any signal to the specific UE. Referring to FIG. 9, at time T0, the MeNB=1 may be served by a set of SeNB1 and SeNB2, and thus, SeNB1 and SeNB2 may transmit MeNB=1 signals in the dedicated resource for UE1 using the UE dedicated resource. It may follow dynamic scheduling instead of dedicated UE resource if SeNBs can coordinate scheduling in real-time. However, if real-time scheduling coordination is not feasible as each cell/TP has independent scheduler or not connected via ideal backhaul, it is desirable to fix necessary scheduling information such as resource allocation, modulation and coding scheme (MCS), etc. To determine UL target SeNB, it may be considered to utilize UL CoMP framework. For example, demodulation reference signal (DMRS) scrambling identity and power control, PUCCH resource may be configured for each UE which may be used regardless of UE mobility.

FIG. 10 shows an example of a method for communicating with a UE according to an embodiment of the present invention. In step S100, the network configures a plurality of cells as a MeNB and each cell among the plurality of cells as a SeNB. In step S110, the network communicates with the UE using the configured plurality of cells. The network may further configure a set of subframes or resources for the MeNB. In this case, the network may communicate with the UE using a cell ID of the MeNB in the set of subframes or resources for the MeNB. The network may further configure TDM information between the MeNB and the SeNB. The network may further configure discovery signal based measurement. The network may further re-configure the MeNB by pre-configuration when the UE moves from one MeNB to other MeNB. The network may further switch the MeNB autonomously based on UE measurement. The network may further transmit a confirmation to the UE upon switching the MeNB. The network may further configure a UE-specific cell ID and a corresponding resource.

Second, configuration of an amorphous cell by maintaining a virtual cell via dynamic CoMP set according to an embodiment of the present invention is described.

FIG. 11 show an example of configuration of an amorphous cell by dynamic CoMP set according to an embodiment of the present invention. Referring to FIG. 11, at time T0, TP1/TP2/TP3/TP4 collaborate to support UE. At time T1, TP2/4/5/7 collaborate to support UE. At time T2, TP5/6/7/8 collaborate to support UE. In this case, the mechanism of maintaining the serving cell may be as follows.

(1) Use the same cell ID for all TPs in the network: Regardless where the UE is located, the same cell ID may be used for the serving cell. Furthermore, this approach also requires having consistent RRC configurations by all TPs including such as PUCCH resource/sounding RS (SRS) resource. Thus, when a UE is initially associated, the necessary configurations may be configured and then the information may be shared among TPs/cells via X2 or inter-TP/cell signaling.

(2) UE-dedicated cell: If the network size is large, utilizing the same cell ID may not be so effective if there are UEs without supporting CoMP capabilities. Thus, similarly to case of configuration of the amorphous cell by dual connectivity described above, a set of subframes and/or resources may be allocated for a cell where the network may support multiple cells. In this case, a UE may be configured with a physical cell ID optionally with dedicated resource which may be used for RRC configurations, and necessary control plane data/signal transmissions. For other data/signal transmission, per-TP transmission may be assumed. To maintain the same cell ID, each TP/cell in a CoMP set may transmit signals based on the UE-allocated cell ID to serve a specific UE. For example, if UE1 is allocated with cell ID=1, then TP1/2/3/4 may use cell ID=1 at time T0 to serve the UE.

(3) Fast cell switch: If a cell ID used by each CoMP set is determined, similarly to case of configuration of the amorphous cell by dual connectivity described above, a UE may be switched with different cell ID whenever CoMP set is changed via dynamic signaling or other signaling with pre-configured configuration information.

FIG. 12 shows another example of a method for communicating with a UE according to an embodiment of the present invention. In step S200, the network configures a plurality of TPs for a virtual cell. In step S210, the network communicates with the UE using the configured plurality of TPs. The plurality of TPs may use the same cell identifier (ID). A part of the plurality of TPs may consist of a UE-dedicated cell. A set of subframes or resources may be allocated to the UE-dedicated cell. In this case, the network may communicate with the UE using a UE-allocated cell ID in the set of subframes or resources. The network may further switch the UE whenever CoMP set is changed.

In general, the approach of maintaining dual connectivity described above (FIG. 6 to FIG. 10) may be applied to maintaining the virtual cell described above (FIG. 11 to FIG. 12). Based on this, managing CoMP set according to an embodiment of the present invention is further discussed below. In transmission mode (TM) 10, the way of managing a set of TPs which may serve data transmission is to use a pseudo quasi collocated indicator (PQI) where a set of PQIs related configurations are configured in a PQI-table. Each PQI entry may contain information about feedback channel status information RS (CSI-RS) resource, data rate matching pattern, and quasi-collocation (QCL) information. Whenever a UE switches a CoMP set, the PQI entry/table needs to be updated as well. In general, three approaches may be considered to dynamically change a CoMP set.

(1) Dynamic change via DCI or signaling: First approach is to preconfigure a set of TPs and then change a set of TPs at a given time via DCI or other signaling. For example, a UE is configured with all TPs, then depending on UE mobility, the set of serving TPs may be changed via dynamic signaling. For example, TPs may be configured with index and then dynamic DCI, such as a bitmap to include all the configured TPs, may be transmitted to enable or disable certain TP. For example, if 10 TPs are configured, then, index 0 may be assigned to the first TP and index 1 may be assigned to the second TP and so on. DCI of 10 bits may enable/disable a certain set of TPs at a given time. For example, [1 1 0 0 1 0 0 0 0 0] may enable the first TP, second TP and fifth TP. From the lowest index, each TP may be mapped to PQI entry 0, 1, and so on.

It is also considerable to configure a set of PQI tables and then, PQI table may be selected via DCI signaling. For example, TP1/TP2/TP3 may form a first PQI table, TP2/TP4/TP5 may form a second PQI table, and so on. Each PQI table may have an index which may be used to trigger/signal which PQI table is used. If DCI is used, the change may be effective at least 1 ms (or k ms) afterwards to allow UE processing time. To handle the case of DCI missing, if this approach is used, the reconfiguration DCI may be transmitted in a pre-determined set of subframes where a UE needs to monitor the DCI. The UE may report DCI missing to the network if DCI has not been detected. Or, it may be also considerable that the network may pre-indicate that reconfiguration may be transmitted in a near future (e.g., in a few ms), then the UE may monitor DCI and then report ACK or NACK if not detected. If the set of PQI tables are pre-configured, DCI may include activated PQI table.

(2) Automatic CoMP set update based on RRM measurement: A set of TPs may be preconfigured and the set of TPs may be selected based on UE measurements. Before reporting reference signal received power (RSRP) measurements, the UE may list the best cells in order and reports it to the network. Upon receiving the list of best cells, the network may update PQI entries of the UE accordingly, and may transmit an ACK to confirm the change of CoMP set.

To support this procedure, the UE should be able to perform RRM for each TP, regardless of the associated cell ID. For example, TPs may share the same cell ID or different cell IDs, depending on the mechanism of maintaining the serving cell. Thus, RRM on TPs may need to be performed rather independently from the cell search. One example is to use discovery signals such as CSI-RS resource for discovery signals where each TP may configure a set of resources where discovery signal is transmitted, and the UE measures the quality of each TP at a given set of resource for that specific TP. For the measurement reports, a UE may be configured with reporting the best k cells periodically instead of reporting all the measurements to minimize the reporting overhead. As it may not support handover, event-triggered measurement report may not be used. Instead, periodic measurement report may be configured. More specifically, measurement for cells may be event-triggered whereas measurement for TPs may be periodically reported. In other words, separate report measurement type/trigger condition may be configured for cells and TPs.

FIG. 13 shows an example of a RRM measurement based automatic CoMP set update procedure according to an embodiment of the present invention. Referring to FIG. 13, to receive RRC, HARQ-ACK, PUSCH, etc., from the UE, the network may assign a TP or a cell as an UL receiver (UL target in FIG. 13) which may receive UL transmission from the UE. Since control signaling such as RRC and HARQ-ACK need to be shared among collaborating TPs/cells, the following may be performed.

Each TP/cell may overhear UL transmission. To allow this, the other TPs/cells (other than UL target) also need to know when the UE transmit and the resource that UE uses. Thus, to enable this, the UE may transmit UL data at a configured set of resources only. More specifically, the UE may transmit control signals in a dedicated resource in terms of time and frequency whereas the data can be transmitted anytime based on UL grant. To support this, the UE may be configured with semi-persistent scheduling (SPS)-like PUSCH configuration where a UE may transmit control information in that resource in a given time if any data is available. For example, RRM measurement may be forwarded in a pre-determined resource so that other cells/TPs can overhead as well.

The UL target may forward UL control/signal to other TPs/cells: If each TP/cell cannot overhear UL transmission, or even though each TP/cell can overhear UL transmission, the UL target may forward UL signals to other eNBs/TPs/cells. For example, HARQ-ACK may be forwarded by the UL target to the sender of PDSCH. If ideal backhaul is available, backhaul may be used for UL signal forwarding. Otherwise, layer 1 relay or air-interface based UL data forwarding may also be considered, where the sender may expect to receive UL HARQ-ACK from the UL target once it has transmitted data to the UE at n+5 (if it transmits PDSCH at n-th subframe) in FDD or n+k+1 in TDD. In other words, the HARQ-ACK timing for the sender may be changed. However, PHICH may be transmitted based on the currently specified timing, i.e. n+8-th DL subframe from the UL target may include PHICH. UL data forwarding may be also achieved via backhaul if backhaul latency is sufficiently small.

Referring to FIG. 13, whenever the UE reports a set of best TPs, the UE may automatically update its PQI table aligned with measurements. If the network transmits the ACK to the UE, and then, the UE may assume the negotiation/update of PQI table has been successfully performed. When the network receives RRM report, and a new TP is selected as one of a best TP in the list, the new TP may transmit ACK to the UL target (or controlling TP) that it can accept the UE or not. If the TP is fully congested or has certain conditions such that it may not be able to accept the new UE, the TP may reject the request. In that case, data transmission from that TP may not be occurred. However, PQI table in the UE may not be updated. The number of collaborative TPs at one time (i.e., the maximum number of PQI entries) may be configured by the network, which may be the same parameter of RRM reporting (how many best cells would be reported). Or, a separate higher layer signaling to configure the number of best cells may also be configured. If two parameters are not aligned, PQI table may take the minimum of two parameters.

It may be further considered to have a default TP or default PQI, which may be used during the update of PQI entries. For example, a separate configuration of default TP may be considered, which may be reconfigured only by the higher layer signaling. During PQI table updates, if any PDSCH is transmitted, default PQI table may be used to interpret the data. Or, a UE may be served by only a default TP (e.g., PQI=1) during PQI table update. Alternatively, a UE may have to blindly search TP during PQI entry update to address the ambiguity. Handling of ambiguity needs to be addressed.

(3) UE-dedicated resource based transparent TP update: Another approach is to maintain the same set of TPs and PQI table regardless of UE mobility by tight coordination among TPs and by allocating UE-dedicated set of TPs and the associated resources. In this case, any update on RRC parameters including PQI table or pre-configuration may not be necessary. To support consistent RRC parameters in spite of CoMP set change, this embodiment of the present invention may propose UE-dedicated resource which may be used regardless of CoMP set which includes a set of virtual cell ID which can be mapped to a TP in the CoMP set.

FIG. 14 shows an example of a UE-dedicated resource based transparent TP update procedure according to an embodiment of the present invention. To obtain the list of best cells (so that the network properly changes TPs according to UE PQI table), overall two approaches can be considered. First approach is to use UL signal such as SRS and the network measures the best TPs/cells based on UL signals. Second approach is to use UE measurements. The embodiment shown in FIG. 14 is based on the second approach. If the second approach is used, a discovery signal may be considered where a discovery signal from a TP is transmitted periodically. The scrambling ID of a discovery signal from a TP may be different from scrambling ID of feedback CSI-RS using the second approach. For example, if TP1 is serving the UE with VCID=2 at a moment, TP1 may transmit discovery signal with VCID=1 whereas it transmits feedback RS with VCID=2 so that the feedback may be performed based on VCID=2.

To avoid a collision case where more than one TPs transmit discovery signal and feedback RS in the same resource (and thus may degrade measurement performance), it is desirable to separate resource for discovery signal and feedback RS signals. When a UE reports that the set of best TPs/cells are changed, the network may change the set of collaborating TPs/cells for that specific UE as shown in FIG. 14. For example, TP4 may be changed to PQI=3 with VCID=3 when TP3 moves away from the UE and TP4 becomes better cell for that UE. When TP4 inherits VCID=3, it may use resources for VCID=3 for its feedback CSI-RS transmission and uses VCID=3 for scrambling sequence for any signal transmission to the UE. If a TP serves more than one UE, it may use more than one virtual cell ID for data/signal scrambling. For example, if VCID=1 is used for UE1, VCID=2 is used for UE2, data transmission to UE1 may use VCID=1 as a scrambling sequence and data transmission to UE2 may use VCID=2 as a scrambling sequence. Also, the TP may transmit two feedback CSI-RS resource as it supports two UEs—one for each UE respective.

FIG. 15 shows an example of resource mapping for each VCID and change of VCID according to an embodiment of the present invention. Referring to FIG. 15, when a UE is not connected to any TP, the UE first performs the measurement and finds a best TP or CoMP set. To support UE measurement, discovery signal from each TP, such as using CSI-RS resource, may be considered. In that case, a TP with TPID=1 may use CSI-RS resource allocated to VCID=1. However, to avoid collision between feedback CSI-RS and discovery signal, the UE may assume that feedback CSI-RS may be transmitted in separate resources from discovery signal. In case two signals may collide, the UE may assume that feedback RS may have higher priority over discovery signal, and thus, it may assume that feedback RS is transmitted in the resource where discovery signal and feedback RS collide.

FIG. 16 shows an example of resource usage based on joint transmission according to an embodiment of the present invention. Assuming that TPs belonging to a CoMP set perform joint transmission to the UE, feedback RS from all TPs may be transmitted in the same resource in a SFN manner. That is, one CSI-RS may be configured to the UE in a SFN manner. It is assumed that scrambling ID for DMRS=1 and scrambling ID for CSI-RS=1. In this case, individual feedback to each TP is not expected. Including data, all transmission may occur jointly.

FIG. 17 shows an example of resource usage based on dynamic point selection according to an embodiment of the present invention. Joint transmission or dynamic point selection (DPS) mechanism may be considered where individual feedback to each TP is still expected. In this case, if a UE is served by four TPs with VCID=1 to 4, it may be configured with four PQI entries matching VCID=1 to 4 non-zero power (NZP)-CSI-RS resource with accordingly zero-power (ZP)-CSI-RS resources. When the UE switches a CoMP set, the participating TPs may change (e.g., from TP1/2/3/4 to TP2/4/5/7 in T1), yet the set of NZP-CSI-RS resources and ZP-CSI-RS configurations may not be changed. New participating TPs may inherit NZP-CSI-RS resources from previous TPs.

Not to change ZP-CSI-RS resources, either a large set of ZP-CSI-RS configuration covering the potential NZP-CSI-RS configurations may be configured or ZP-CSI-RS configuration may not be changed regardless of the change of actual TPs. One simple way of implementing the first approach is to configure ZP-CSI-RS covering all possible NZP-CSI-RS configuration. For multicast-broadcast single-frequency network (MBSFN) configuration, it may be assumed that the same MBSFN configuration is used among collaborating sets such that RRC reconfiguration is not needed. To align MBSFN configuration among TPs, either the overlaid macro or controlling eNB may send MBSFN configuration to collaborating TPs in the network. Here, collaborating TPs may be defined as a set of TPs where a UE can switch serving TPs without handover or other RRC reconfiguration mechanisms. For other parameters such as the starting OFDM symbol, the UE may assume that the same parameters are used even though physical TPs may change unless explicit reconfiguration is performed.

Backhaul signaling to support UE-transparent TP/cell switch according to an embodiment of the present invention is described. Collaborating TPs/Cells may need to coordinate UE-specific RRC configurations such that the UE may not be required to be reconfigured regardless of cell/TP switch. Some essential parameters of RRC configurations are as follows.

(1) Carrier aggregation (CA) related parameters such as configured secondary cell (SCell): Not to incur too much overhead of maintaining amorphous cell in more than one carrier or the dependency between amorphous carriers, it is not desirable to configure cross-carrier scheduling if amorphous cell is used in either scheduling or scheduled carrier.

(2) Dual connectivity related parameters such as SeNB related RRC parameters: If the SeNB configures amorphous cell, it is desirable to maintain the same RRC parameters among collaborating cells/TPs corresponding to SeNB.

(3) Radio resource control: To maintain the same configurations, when a serving cell is determined initially, either the serving cell or controlling eNB broadcasts a unique UE-ID (such as C-RNTI which is unique among collaborating TPs/Cells in the network) with RRC configurations including at least one of the followings.
  CQI-report: The configuration of periodic/aperiodic CSI report related configuration may be exchanged among collaborating TPs/cells to align its periodicity and the associated resources (such as PUCCH resource).
  CSI process: Similar to PQI, to support UE-transparent switch, CSI process may be assumed as constant regardless of actual TPs/cells serving the UE at a given moment.
  DMRS configuration
  Enhanced PDCCH (EPDCCHO configuration including PRB and subframe: To assign UE-specific EPDCCH configuration, controlling eNB may assign UE-dedicated EPDCCH resource which does not need to be changed in spite of serving cell change
  PDCCH configuration
  PHICH configuration
  PUCCH/PUSCH configuration
  Radio resource configuration including both common and dedicated
  TDD configuration
  Carrier frequency, bandwidth
  Measurement object and reported related parameters
  SRS configuration: To align SRS configuration and not change regardless of the serving TP/cell, it is desirable to have a group-common SRS configuration which may be configured by a controlling eNB or an overlaid macro cell.

When a new TP joins the collaborating set or the serving TP/cell changes, at least one of the followings (but not limited to the followings) values may be inherited.
  Timing advance (TA) value: To align TA fast, the new serving TP/cell may initiate physical random access channel (PRACH).
  UL power: To handle a potential gap in terms of uplink power (such as due to pathloss differences), either accumulation or current absolute based transmit power control (TPC) may be dynamically chosen (such as via a new field in DCI or utilizing existing bit such as distributed/localized if either mode is not used). Alternatively, whenever the UE is requested to transmit PRACH, the UE may update its pathloss information such that the different pathloss can be applied immediately.
  HARQ-ACK: During the switch, the UE may transmit HARQ-ACK to the pervious
  UL target where the cell/TP may forward HARQ-ACK to the new UL target via ideal backhaul or air interface.

To inherit those values, accumulated timing advance value and accumulated TPC values may be forwarded from the previous serving cell to the new serving cell via backhaul signaling or other signaling.

DL/UL TP/cell separation according to an embodiment of the present invention is described. To increase spectral efficiency, cell splitting may be considered by deploying denser and smaller cells, which will lead frequent TP/cell switch. The change of DL TP/cell may be handled by the network via soft-handover like mechanisms. However, the change of UL TP/cell may involve e.g. UE transmitting PRACH to adjust TA and power. Thus, it is considerable to maintain DL and UL coverage independently. For example, small DL coverage by small DL power whereas larger UL coverage by utilizing UE maximum power may be considered. Based on the current UE maximum power, the UL coverage may be macro coverage whereas DL coverage is limited to very small range. By doing this, the frequency of UL cell change may be considerably reduced and thus necessary UE adjustments in terms of UL transmission may be minimized.

FIG. 18 shows an example of DL/UL separation according to an embodiment of the present invention. If UL and DL are maintained separately, the received UL data may have to be forwarded to the serving TP/cell and/or collaborating TPs/cells. For example, if TP1 is used for the UL target even though it becomes out-of-coverage for DL link, TP1 may have to forward received UL traffic to other serving TPs/cells. To allow fast forwarding, either ideal backhaul or air-interface based data forwarding may be considered. Since SRS cannot be forwarded, other TPs may listen to SRS for its measurements.

To avoid some issue related to scheduling (where PHICH resource may be determined by PUSCH where PUSCH can be scheduled by different TP/cell from PHICH transmitting TP/cell), it may be considered to use UE-dedicated PHICH or TP-dedicated PHICH where PHICH resource is determined e.g. using DMRS scrambling sequence and/or UE-ID and/or PUSCH resource.

FIG. 19 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for communicating, by a network, with a user equipment (UE) in a wireless communication system, the method comprising:
    collaborating a plurality of base stations;
    configuring the collaborated base stations as a first master base station;
    configuring each of the plurality of base stations as a secondary base station;
    configuring a first set of resources for the first master base station;
    communicating with the UE based on an identifier (ID) of the first master base station, in the configured first set of resources for the first master base station, via the collaborated base stations configured as the first master base station; and
    communicating with the UE based on an ID of the secondary base station, in a second set of resources different from the first set of resources, via the each of the plurality of base stations configured as the secondary base station,
    wherein the same set of transmission points (TPs) and a pseudo quasi collocated indicator (PQI) table are maintained regardless of a mobility of the UE by using a tight coordination among the TPs and by allocating a UE-dedicated set of TPs and associated resources,
    wherein a UE-dedicated resource based transparent TP update procedure is performed by using a discovery signal transmitted periodically from a TP,
    wherein a scrambling ID of the discovery signal transmitted periodically from the TP is different from a scrambling ID of feedback channel status information—reference signal (CSI-RS), and
    wherein two different types of resources are used in order to avoid a collision between the discovery signal transmitted periodically from the TP and the feedback CSI-RS.

2. The method of claim 1, further comprising configuring time division multiplexing (TDM) information between the first master base station and the secondary base station.

3. The method of claim 1, further comprising:
    configuring discovery signal based measurement.

4. The method of claim 1, further comprising:
    re-configuring the first master base station by pre-configuration when the UE moves from the first master base station to a second master base station.

5. The method of claim 1, further comprising:
    switching the first master base station to a second master base station autonomously based on UE measurement.

6. The method of claim 5, further comprising:
    transmitting a confirmation to the UE upon the switching of the first master base station to the second master base station.

7. The method of claim 1, further comprising;
    configuring a UE-specific cell ID and a related resource.

* * * * *